US011122108B2

(12) United States Patent
Chen et al.

(10) Patent No.: US 11,122,108 B2
(45) Date of Patent: Sep. 14, 2021

(54) END-TO-END FILE TRANSMISSION METHOD AND SYSTEM THEREOF

(71) Applicant: CHINA UNIONPAY CO., LTD., Shanghai (CN)

(72) Inventors: Lin Chen, Shanghai (CN); Xiao Zhuang, Shanghai (CN); Jintan Wu, Shanghai (CN); Yanming Yang, Shanghai (CN); Jinzhi Hua, Shanghai (CN)

(73) Assignee: CHINA UNIONPAY CO., LTD., Shanghai (CN)

(*) Notice: Subject to any disclaimer, the term of this patent is extended or adjusted under 35 U.S.C. 154(b) by 14 days.

(21) Appl. No.: 16/453,708

(22) Filed: Jun. 26, 2019

(65) Prior Publication Data

US 2019/0320009 A1 Oct. 17, 2019

Related U.S. Application Data

(63) Continuation of application No. 14/439,223, filed as application No. PCT/CN2013/086030 on Oct. 28, 2013, now abandoned.

(30) Foreign Application Priority Data

Oct. 31, 2012 (CN) .......................... 201210426080.8

(51) Int. Cl.
*G06F 15/16* (2006.01)
*H04L 29/08* (2006.01)
*H04L 29/06* (2006.01)

(52) U.S. Cl.
CPC .............. *H04L 67/06* (2013.01); *H04L 67/10* (2013.01); *H04L 67/28* (2013.01); *H04L 67/42* (2013.01); *H04L 63/10* (2013.01)

(58) Field of Classification Search
CPC ......... H04L 67/06; H04L 67/28; H04L 67/10; H04L 67/42; H04L 63/10
See application file for complete search history.

(56) References Cited

U.S. PATENT DOCUMENTS 5,742,792 A * 4/1998 Yanai .................... G06F 3/0601
711/162
2002/0143798 A1* 10/2002 Lisiecki .............. H04L 67/1008
(Continued)

FOREIGN PATENT DOCUMENTS

CN 101163081 A 4/2008
CN 101277248 A 10/2008
(Continued)

OTHER PUBLICATIONS

European Search Report dated May 25, 2016, European Application No. 13851291.
(Continued)

*Primary Examiner* — Padma Mundur
(74) *Attorney, Agent, or Firm* — Anova Law Group, PLLC

(57) ABSTRACT

The invention provides a file transmitting method and system. The file transmitting method is used for a system comprising N network file systems, N file receiving and forwarding servers, N network access servers, N client servers and N backstage servers that are in a one-to-one correspondence with the network file systems, comprising: the backstage server sends a file transmitting request to the file receiving and forwarding server, the file transmitting request comprises information on the file sending party, the file destination party and the file to be transmitted; the file receiving and forwarding server verifies the legitimacy of the file transmitting request; if legitimate, a file is transmitted between the file sending party and the file destination party; otherwise, a response that prohibits the transmitting is (Continued)

generated and returned to the backstage server that initiated the request. With the invention, transmission of files can be realized.

7 Claims, 4 Drawing Sheets

(56) References Cited

U.S. PATENT DOCUMENTS

| | | | | |
|---|---|---|---|---|
| 2005/0169173 | A1* | 8/2005 | Mahdavi | H04L 47/2475 370/230 |
| 2011/0173345 | A1* | 7/2011 | Knox | H04N 21/23106 709/246 |
| 2012/0084301 | A1* | 4/2012 | Sarnowicz | G06F 16/9535 707/754 |
| 2012/0102226 | A1* | 4/2012 | Hopmann | H04L 67/1002 709/241 |
| 2012/0167193 | A1* | 6/2012 | Gargaro | H04L 63/0846 726/8 |
| 2012/0221845 | A1* | 8/2012 | Ferris | H04L 67/1097 713/150 |
| 2012/0303739 | A1* | 11/2012 | Ferris | H04L 69/329 709/217 |
| 2013/0204849 | A1* | 8/2013 | Chacko | G06F 3/0641 707/692 |

FOREIGN PATENT DOCUMENTS

| | | |
|---|---|---|
| CN | 101699825 A | 4/2010 |
| CN | 101764848 A | 6/2010 |
| CN | 101883028 A | 11/2010 |
| CN | 1752977 B | 5/2011 |
| CN | 101355476 B | 5/2011 |

OTHER PUBLICATIONS

Brewer, Eric A., "Lessons from Giant-Scale services", Extracted from the Internet: http://www.cs.berkeley.edu/~brewer/Giant.pdf, Aug. 31, 2001, p. 46-55.

Cardellini, Valeria, "The state of the art in locally distributed Web-server systems", ACM Computing Surveys (CSUR), vol. 34, No. 2, Extracted from the Internet: http://dl.acm.org/citation.cfm?id=508355, Jun. 1, 2002, 263-311.

Chen, Huamin, et al., "A Tiered System for Serving Differentiated Content", vol. 5, No. 4, Extracted from the Internet: http://rd.springer.com/article.10.1023%2FA%3A1025609904398, Dec. 1, 2003, p. 331-352.

* cited by examiner

END-TO-END FILE TRANSMISSION METHOD AND SYSTEM THEREOF

CROSS-REFERENCE TO RELATED APPLICATIONS

This application is a continuation application of U.S. patent application Ser. No. 14/439,223, filed on Apr. 28, 2015, which is a national stage entry of PCT Patent Application No. PCT/CN2013/086030, filed on Oct. 28, 2013, which claims priority to Chinese Patent Application No. 201210426080.8, filed on Oct. 31, 2012, all of which are incorporated by reference in entirety.

FIELD OF THE INVENTION

The invention relates to the technical field of data processing, in particular, to a file transmitting method and system.

BACKGROUND

The most common end to end file transmission must be consistent in network protocol, in direct connection, timely, on-line, completely active or completely passive; it can neither fulfill a transmission at a given time, nor transfer the file according to the requirements by different clients or in case of abnormality of client, nor support a cross network and cross platform transmission.

Chinese patent issue No. CN101355476B discloses a data file storing, distributing and applying system and method based on a server cluster. This system comprises a plurality of server clusters that are distributed on the internet, wherein each server cluster comprises a plurality of servers that are disposed on a metropolitan area network or a local area network, and the servers can be divided into a management server, an application server and a network file server; the servers within the clusters can connected to each other via the metropolitan area network or a local area network, and the server clusters of different metropolitan area networks are connected to each other via internet or a wide area network. The server cluster is distributed at a location that is closet to the user, and is connected to the client of the user through a metropolitan area network, an access network or a local area network. The management server is responsible for the management of the cluster to which it belongs, including the management of the server, the user, data file and application programs, as well as communication and coordination with other clusters. The application server runs application software and provides the user with application service through a network. The network file system provides a storage space for storing and distributing data file.

Though Chinese patent issue No. CN101355476B proposes a file transmitting system, it has many specific service logics and is applied to many clusters on the internet, and is complicated in structure.

SUMMARY OF THE INVENTION

In view of the above, the invention provides a file transmitting system and method for transmitting files.

The invention provides a file transmitting method, which is used for a system comprising N network file systems, N file receiving and forwarding servers, N network access servers, N client servers and N backstage servers that are in a one-to-one correspondence with the network file systems, the file transmitting method comprising:

the backstage server sends a file transmitting request to the file receiving and forwarding server, which file transmitting request comprises information on the file sending party, the file destination party and the file to be transmitted;

the file receiving and forwarding server verifies the legitimacy of the file transmitting request; if legitimate, a subsequent step is performed; otherwise, a response that prohibits the transmitting is generated and returned to the backstage server that initiated the request;

if it is determined that the file sending party is the backstage server that initiated the request, the file receiving and forwarding server determines whether the file destination party is another backstage server or the client server;

if the file destination party is another backstage server, the file receiving and forwarding server reads a file from a network file system that corresponds to the file sending party according to the information on the file to be transmitted, and stores the file in a network file system that corresponds to the file destination party;

if the file destination party is the client server, the network access server is informed to establish a connection between the file receiving and forwarding server and the client server, and a file is read from a network file system that corresponds to the file sending party according to the information on the file to be transmitted, and is forwarded to the client server;

if it is determined that the file destination party is the backstage server that initiated the request, the file receiving and forwarding server determines whether the file sending party is another backstage server or the client server;

if the file sending party is another backstage server, the file receiving and forwarding server reads a file from a network file system that corresponds to the file sending party according to the information on the file to be transmitted, and stores the file in a network file system that corresponds to the file destination party;

if the file destination party is the client server, the network access server is informed to establish a connection between the file receiving and forwarding server and the client server, and the client server is informed to send file according to the information on the file to be transmitted and the received file is stored in a network file system that corresponds to the backstage server that initiated the request.

The invention also provides a file transmitting method, which is used for a system comprising N network file systems, N file receiving and forwarding servers, N network access servers, N client servers and N backstage servers that are in a one-to-one correspondence with the network file systems, the file transmitting method comprising:

the client server sends a file transmitting request to the file receiving and forwarding server through the network access server, which file transmitting request comprises information on the file sending party, the file receiving party and the file to be transmitted;

the file receiving and forwarding server verifies the legitimacy of the file transmitting request; if legitimate, a subsequent step is performed; otherwise, a response that prohibits the transmitting is generated and returned to the client server that initiated the request;

if it is determined that the file sending party is the client server that initiated the request, the file receiving and forwarding server determines whether the file destination party is the backstage server, another client server or this file receiving and forwarding server;

if the file destination party is the backstage server, the client server is informed to send file according to the information on the file to be transmitted, and the received file is stored in a network file system that corresponds to the file destination party;

if the file destination party is another client server, the network access server is informed to establish a connection between the file receiving and forwarding server and said another client server, and the client server is informed to send file according to the information on the file to be transmitted and the received file is forwarded to said another client server;

if the file destination party is the file receiving and forwarding server, a network file system is designated according to a load balancing principle, and the client server is informed to send file according to the information on the file to be transmitted and the received file is stored in the designated network file system;

if it is determined that the file destination party is the client server that initiated the request, the file receiving and forwarding server determines whether the file sending party is the backstage server, another client server or this file receiving and forwarding server;

if the file sending party is the backstage server, a file is read from a network file system that corresponds to the backstage server according to the information on the file to be transmitted, and the received file is forwarded to the client server that initiated the request;

if the file sending party is another client server, the network access server is informed to establish a connection between the file receiving and forwarding server and said another t) client server, and said another client server is informed to send file according to the information on the file to be transmitted and the received file is forwarded to the client server that initiated the request;

if the file sending party is the file receiving and forwarding server, a network file system is determined according to the information on the file to be transmitted, a file is read from the determined network file system and the read file is forwarded to the client server that initiated the request.

Preferably, in the above file transmitting method of the invention, when the file receiving and forwarding server determines that the file sending party is the client server that initiated the request and the file destination party is another client server, the network access server is informed to establish a connection between the file receiving and forwarding server and said another client server;

said another client server is informed by the network access server to receive file;

when the file receiving and forwarding server receives a response that permits the transmitting, the received file is forwarded to said another client server;

when a response that prohibits the transmitting is received, a network file system is designated according to a load balancing principle, and the received file is stored in the designated network file system; a file transmitting request that is to be processed is generated in which the file sending party is the file receiving and forwarding server and the file destination party is said another client server, and after a predetermined time period, the file transmitting request is performed until said another client server receives the file.

Preferably, in the above file transmitting method of the invention, when the file receiving and forwarding server determines that the file sending party is another client server and the file destination party is the client server that initiated the request, the network access server is informed to establish a connection between the file receiving and forwarding server and said another client server;

said another client server is informed by the network access server to send file;

when the file receiving and forwarding server receives a response that permits the transmitting, receives the file from said another client server;

when a response that prohibits the transmitting is received, a first file transmitting request that is to be processed and a second file transmitting request that is to be processed are generated; in the first file transmitting request that is to be processed, the file sending party is said another client server, and the file destination party is the file receiving and forwarding server; and in the second file transmitting request that is to be processed, the file sending party is the file receiving and forwarding server, and the file destination party is the client server that initiated the request;

after a predetermined time, the first file transmitting request that is to be processed is performed;

after successfully performing the first file transmitting request that is to be processed, the second file transmitting request that is to be processed is performed.

Preferably, in the above file transmitting method of the invention, the file transmitting method further comprises: the file receiving and forwarding server generates a file transmitting result message and sends it to the backstage server that initiated the request.

Preferably, in the above file transmitting method of the invention, before the file receiving and forwarding server forwards the file to the client server, the file is pre-processed in order to generate a file that meets the requirements on the file format of the client server, and the pre-processed file is sent to the client server.

Preferably, in the above file transmitting method of the invention, the file transmitting request further comprises timing information, and the above file transmitting method further comprises that in case that the file receiving and forwarding server determines the file transmitting request is legitimate, the file receiving and forwarding server determines whether the timing information is satisfied; if satisfied, a subsequent step is performed; otherwise, the file receiving and forwarding server records the file transmitting request as a file transmitting request that is to be processed, and a subsequent step is performed after the timing information is satisfied.

The invention provides a file transmitting system which comprises N file receiving and forwarding servers, N network access servers, N client servers and N backstage servers that are in a one-to-one correspondence with the network file systems, and the file receiving and forwarding server comprises a verification module and a file receiving and forwarding module, wherein:

the backstage server sends a file transmitting request to the verification module of the file receiving and forwarding server, which file transmitting request comprises information on the file sending party, the file destination party and the file to be transmitted;

the verification module of the file receiving and forwarding server verifies the legitimacy of the file transmitting request; if legitimate, the file transmitting request is forwarded to the file receiving and forwarding module; otherwise, a response that prohibits the transmitting is generated and returned to the backstage server that initiated the request;

if it is determined that the file sending party is the backstage server that initiated the request, the file receiving and forwarding module determines whether the file destination party is another backstage server or the client server;

if the file destination party is another backstage server, the file receiving and forwarding module reads a file from a network file system that corresponds to the file sending party according to the information on the file to be transmitted, and stores the file in a network file system that corresponds to the file destination party;

if the file destination party is the client server, the network access server is informed to establish a connection between the file receiving and forwarding server and the client server, and a file is read from a network file system that corresponds to the file sending party according to the information on the file to be transmitted, and is forwarded to the client server;

if it is determined that the file destination party is the backstage server that initiated the request, the file receiving and forwarding module determines whether the file sending party is another backstage server or the client server;

if the file sending party is the another backstage server, the file receiving and forwarding server reads a file from a network file system that corresponds to the file sending party according to the information on the file to be transmitted, and stores the file in a network file system that corresponds to the file destination party;

if the file sending party is the client server, the network access server is informed to establish a connection between the file receiving and forwarding server and the client server, and the client server is informed to send file according to the information on the file to be transmitted and the received file is stored in a network file system that corresponds to the backstage server that initiated the request.

The invention also provides a file transmitting system which comprises N file receiving and forwarding servers, N network access servers, N client servers and N backstage servers that are in a one-to-one correspondence with the network file systems, and the file receiving and forwarding server comprises a verification module and a file receiving and forwarding module, wherein:

the client server sends a file transmitting request to the verification module of the file receiving and forwarding server through the network access server, which file transmitting request comprises information on the file sending party, the file receiving party and the file to be transmitted;

the verification module of the file receiving and forwarding server verifies the legitimacy of the file transmitting request; if legitimate, the file transmitting request is forwarded to the file receiving and forwarding module; otherwise, a response that prohibits the transmitting is generated and returned to the client server that initiated the request;

if it is determined that the file sending party is the client server that initiated the request, the file receiving and forwarding module determines whether the file destination party is the backstage server, another client server or this file receiving and forwarding server;

if the file destination party is the backstage server, the client server is informed to send file according to the information on the file to be transmitted, and the received file is stored in a network file system that corresponds to the file destination party;

if the file destination party is another client server, the network access server is informed to establish a connection between the file receiving and forwarding server and said another client server, and the client server is informed to send file according to the information on the file to be transmitted and the received file is forwarded to said another client server;

if the file destination party is the file receiving and forwarding server, a network file system is designated according to a load balancing principle, and the client server is informed to send file according to the information on the file to be transmitted and the received file is stored in the designated network file system;

if it is determined that the file destination party is the client server that initiated the request, the file receiving and forwarding module determines whether the file sending party is the backstage server, another client server or this file receiving and forwarding server;

if the file sending party is the backstage server, a file is read from a network file system that corresponds to the backstage server according to the information on the file to be transmitted, and the received file is forwarded to the client server that initiated the request;

if the file sending party is another client server, the network access server is informed to establish a connection between the file receiving and forwarding server and said another client server, and said another client server is informed to send file according to the information on the file to be transmitted and the received file is forwarded to the client server that initiated the request;

if the file sending party is the file receiving and forwarding server, a network file system is determined according to the information on the file to be transmitted, a file is read from the determined network file system and the read file is forwarded to the client server that initiated the request.

Preferably, in the above file transmitting system of the invention, when the file receiving and forwarding module determines that the file sending party is the client server that initiated the request and the file destination party is another client server, the network access server is informed to establish a connection between the file receiving and forwarding server and said another client server;

said another client server is informed by the network access server to receive file;

when a response that permits the transmitting is received, the received file is forwarded to said another client server;

when a response that prohibits the transmitting is received, a network file system is designated according to a load balancing principle, and the received file is stored in the designated network file system; a file transmitting request that is to be processed is generated in which the file sending party is the file receiving and forwarding server and the file destination party is said another client server, and after a predetermined time period, the file transmitting request is performed until said another client server receives the file.

Preferably, in the above file transmitting system of the invention, when the file receiving and forwarding module determines that the file sending party is another client server and the file destination party is the client server that initiated the request, the network access server is informed to establish a connection between the file receiving and forwarding server and said another client server;

said another client server is informed by the network access server to send file;

when a response that permits the transmitting is received, the file is received from said another client server;

when a response that prohibits the transmitting is received, a first file transmitting request that is to be processed and a second file transmitting request that is to be processed are generated; in the first file transmitting request that is to be processed, the file sending party is said another client server, and the file destination party is the file receiving and forwarding server; and in the second file transmitting request that is to be processed, the file sending party is the file receiving and forwarding server, and the file destination party is the client server that initiated the request;

after a predetermined time, the first file transmitting request that is to be processed is performed;

after successfully performing the first file transmitting request that is to be processed, the second file transmitting request that is to be processed is performed.

Preferably, in the above file transmitting system of the invention, the file receiving and forwarding module generates a file transmitting result message and sends it to the backstage server that initiated the request.

Preferably, in the above file transmitting system of the invention, before the file receiving and forwarding module forwards the file to the client server, the file is pre-processed in order to generate a file that meets the requirements on the file format of the client server, and the pre-processed file is sent to the client server.

Preferably, in the above file transmitting system of the invention, the file transmitting request further comprises timing information, and the file receiving and forwarding module determines whether the timing information is satisfied; if satisfied, the file transmitting request is processed; otherwise, the file receiving and forwarding module records the file transmitting request as a file transmitting request that is to be processed, and the file transmitting request is processed after the timing information is satisfied.

With the invention, a transmission of file can be realized. With the method and system of the invention, on-line transfer of files, off-line transfer of files, and a one-to-many on-line transmission of files at a instant time or given time across different networks in an end-to-end manner can be realized on the network between the file receiving and forwarding server and the client server. Moreover, the transmission result of file can be recorded and informed accurately.

DETAILED DESCRIPTION OF THE INVENITON

Preferred embodiments of the invention will be described below with reference to the accompanying drawings, in which identical reference numbers indicate identical elements.

Figure 1:
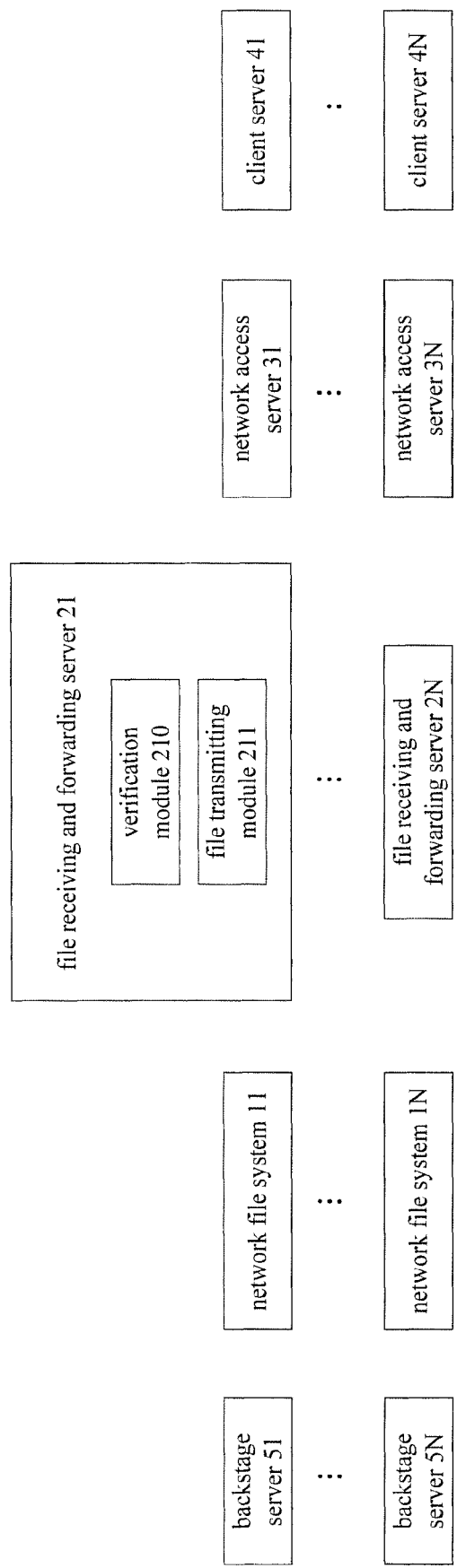
FIG. 1 schematically shows a structure view of the file transmitting system of an embodiment of the invention.

FIG. 1 schematically shows a structure view of the file transmitting system of an embodiment of the invention. As shown in FIG. 1, the file transmitting system comprises N network file systems 11-1N, N file receiving and forwarding servers 21-2N, N network access servers 31-3N, N client servers 41-4N and N backstage servers 51-5N, wherein N is a natural number. The backstage servers 51-5N are in a one-to-one correspondence with the network file systems 11-1N. The network access server is a network apparatus that has a load balancing capability, and is responsible for establishing a connection between the file receiving and forwarding server and the client server.

Each file receiving and forwarding server comprises a verification module and a file transmitting module. In FIG. 1, the verification module 210 and the file transmitting module 211 are only shown in the file receiving and forwarding server 21 for simplifying illustration. However, it is understood that each of the other file receiving and forwarding servers 22-2N comprises respective verification module and file transmitting module.

The backstage server (e.g., the backstage server 51) sends a file transmitting request to the verification module 210 of the file receiving and forwarding server (e.g., the file receiving and forwarding server 21), which file transmitting request comprises information on the file sending party, the file destination party and the file to be transmitted. The verification module 210 verifies the legitimacy of the file transmitting request; if legitimate, the file transmitting request is forwarded to the file receiving and forwarding module 211 so that the file receiving and forwarding module 211 can process the file transmitting request; otherwise, a response that prohibits the transmitting is generated and returned to the backstage server 51 that initiated the request.

If it is determined that the file sending party is the backstage server 51 that initiated the request, the file receiving and forwarding module 211 determines whether the file destination party is another backstage server (e.g., the backstage server 52) or the client server (e.g., the client server 41). If the file destination party is another backstage server 52, the file receiving and forwarding module 211 reads a file from a network file system (e.g., the network file system 11) that corresponds to the file sending party 51 according to the information on the file to be transmitted, and stores the file in a network file system 12 that corresponds to the file destination party (i.e., the backstage server 52). If the file destination party is the client server (e.g., the client server 41), the network access server (e.g., the network access server 31) is informed to establish a connection between the file receiving and forwarding server 21 and the client server 41, and a file is read from a network file system 11 that corresponds to the file sending party (i.e., the backstage server 51) according to the information on the file to be transmitted, and is forwarded to the client server 41. Preferably, before the file receiving and forwarding module 211 forwards the file to the client server 41, the file is pre-processed in order to generate a file that meets the requirements on the file format of the client server 41, and the pre-processed file is sent to the client server 41.

If it is determined that the file destination party is the backstage server 51 that initiated the request, the file receiving and forwarding module 211 determines whether the file sending party is another backstage server (e.g., the backstage server 52) or the client server (e.g., the client server 41).

If the file sending party is another backstage server 52, the file receiving and forwarding module 211 reads a file from a network file system 12 that corresponds to the file sending party 52 according to the information on the file to be transmitted, and stores the file in a network file system 11 that corresponds to the file destination party 51.

If the file sending party is the client server 41, the file receiving and forwarding module 211 informs the network access server (e.g., the network access server 31) to establish a connection between the file receiving and forwarding server 21 and the client server 41, informs the client server 41 to send file according to the information on the file to be transmitted and the received file is stored in a network file system 11 that corresponds to the backstage server 51 that initiated the request.

Preferably, the file transmitting request further comprises timing information, and the file receiving and forwarding module 211 firstly determines whether the timing information is satisfied; if satisfied, the file transmitting request is processed; otherwise, the file receiving and forwarding module 211 records the file transmitting request as a file transmitting request that is to be processed, and the file transmitting request is processed after the timing information is satisfied.

Preferably, the file receiving and forwarding server 211 further generates a file transmitting result message and sends it to the backstage server 51 that initiated the request.

Figure 2:
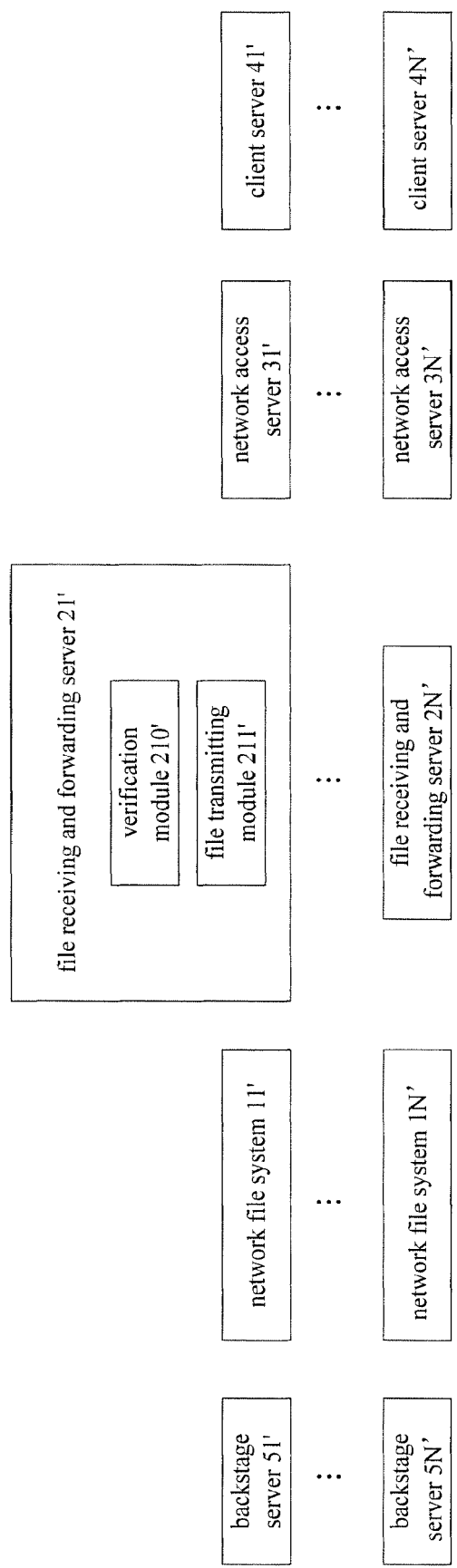
FIG. 2 schematically shows a structure view of the file transmitting system of another embodiment of the invention.

FIG. 2 schematically shows a structure view of the file transmitting system of another embodiment of the invention. As shown in FIG. 2, the file transmitting system comprises N network file systems 11'-1N', N file receiving and forwarding servers 21'-2N', N network access servers 31'-3N', N client servers 41'-4N' and N backstage servers 51'-5N', wherein N is a natural number. The backstage servers 51'-5N' are in a one-to-one correspondence with the network file systems 11'-1N'.

Each file receiving and forwarding server comprises a verification module and a file transmitting module. In FIG. 2, the verification module 210' and the file transmitting module 211' are only shown in the file receiving and forwarding server 21' for simplifying illustration. However, it is understood that each of the other file receiving and forwarding servers 22'-2N' comprises respective verification module and file transmitting module.

The client server (e.g., the client server 41') sends a file transmitting request to the verification module 210' of the file receiving and forwarding server (e.g., the file receiving and forwarding server 21') through the network access server (e.g., the network access server 31'), which file transmitting request comprises information on the file sending party, the file destination party and the file to be transmitted.

The verification module 210' verifies the legitimacy of the file transmitting request; if legitimate, the file transmitting request is forwarded to the file receiving and forwarding module 211'; otherwise, a response that prohibits the transmitting is generated and returned to the client server 41' that initiated the request.

If it is determined that the file sending party is the client server that initiated the request, the file receiving and forwarding server 211' determines whether the file destination party is the backstage server (e.g., the backstage server 51'), another client server (e.g., the client server 42') or the file receiving and forwarding server 21';

if the file destination party is the backstage server 51', the client server 41' is informed to send file according to the information on the file to be transmitted, and the received file is stored in a network file system 31' that corresponds to the file destination party 51'.

If the file destination party is another client server 42', the network access server (which could be the network access server 31' or another network access server which is assumed to be network server 32' herein) is informed to establish a connection between the file receiving and forwarding server 21' and said another client server 42', and the client server 41' is informed to send file through the network access server 31' according to the information on the file to be transmitted and the received file is forwarded to said another client server 42' through the network access server 32'.

Preferably, before the file receiving and forwarding module 211' forwards the file to the client server 42', the file is pre-processed in order to generate a file that meets the requirements on the file format of the client server 42', and the pre-processed file is sent to the client server 42'.

Preferably, after the network access server 32' establishes a connection between the file receiving and forwarding server 21' and said another client server 42', the file receiving and forwarding module 211' informs said another client server 42' through the network access server 32' to receive file. When the file receiving and forwarding module 211' receives a response that permits the transmitting, the received file is forwarded to said another client server 42'. When the file receiving and forwarding module 211' receives a response that prohibits the transmitting, a network file system (e.g., the network file system 11') is designated according to a load balancing principle and the received file is stored in the designated network file system 11'; a file transmitting request that is to be processed is generated in which the file sending party is the file receiving and forwarding server 21' and the file destination party is said another client server 42', and after a predetermined time period, the file transmitting request is performed until said another client server 42' receives the file.

If the file destination party is the file receiving and forwarding server 21', a network file system (e.g., the network file system 11') is designated according to a load balancing principle, and the client server 41' is informed to send file according to the information on the file to be transmitted and the received file is stored in the designated network file system 11'.

if it is determined that the file destination party is the client server 41' that initiated the request, the file receiving and forwarding server 211' determines whether the file sending party is the backstage server (e.g., the backstage server 51'), another client server (e.g., the client server 42') or the file receiving and forwarding server 21'.

If the file sending party is the backstage server 51', a file is read from a network file system 11' that corresponds to the backstage server 51' according to the information on the file to be transmitted, and the received file is forwarded to the client server 41' that initiated the request.

If the file sending party is another client server 42', the network access server (which could be the network access server 31' or another network access server which is assumed to be network server 32' herein) is informed to establish a connection between the file receiving and forwarding server 21' and said another client server 42', and said another client server 42' is informed to send file according to the information on the file to be transmitted and the received file is forwarded to the client server 41' that initiated the request.

Preferably, before the file receiving and forwarding module 211' forwards the file to the client server 41', the file is pre-processed in order to generate a file that meets the requirements on the file format of the client server 41', and the pre-processed file is sent to the client server 41'.

Preferably, after the network access server 32' establishes a connection between the file receiving and forwarding server 21' and said another client server 42', the file receiving and forwarding module 211' informs said another client server 42' through the network access server 32' to send file. When the file receiving and forwarding module 211' receives a response that permits the transmitting, receives the file from said another client server 42' and the received file is forwarded to the client server 41' that initiated the request. When the file receiving and forwarding module 211' receives a response that prohibits the transmitting, a first file transmitting request that is to be processed and a second file transmitting request that is to be processed are generated; in the first file transmitting request that is to be processed, the file sending party is said another client server 42', and the file destination party is the file receiving and forwarding server 21'; and in the second file transmitting request that is to be processed, the file sending party is the file receiving and forwarding server 21', and the file destination party is the client server 41' that initiated the request. After a predetermined time, file receiving and forwarding module 211' performs the first file transmitting request that is to be processed, and after successfully performing the first file transmitting request that is to be processed, the second file transmitting request that is to be processed is performed.

If the file sending party is the file receiving and forwarding server 21', a network file system (i.e., the network file system that stores the file to be transmitted and is assumed to be the network file system 11' herein) is determined according to the information on the file to be transmitted, a file is read from the determined network file system 11', and the received file is forwarded to the client server 41' that initiated the request.

Preferably, the file transmitting request further comprises timing information, and the file receiving and forwarding module 211' firstly determines whether the timing information is satisfied; if satisfied, the file transmitting request is processed; otherwise, the file receiving and forwarding module 211' records the file transmitting request as a file transmitting request that is to be processed, and the file transmitting request is processed after the timing information is satisfied.

Figure 3:
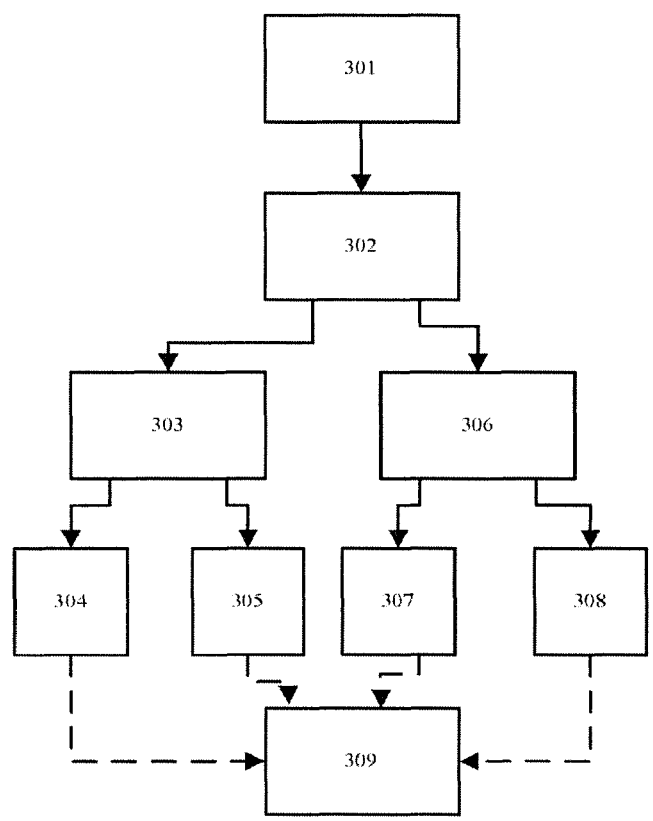
FIG. 3 schematically shows a flowchart of the file transmitting method of an embodiment of the invention.

FIG. 3 schematically shows a flowchart of the file transmitting method of an embodiment of the invention. The file transmitting method is used for a system comprising N network file systems, N file receiving and forwarding servers, N network access servers, N client servers and N backstage servers that are in a one-to-one correspondence with the network file systems.

As shown in FIG. 3, at step 301, the backstage server sends a file transmitting request to the file receiving and forwarding server, the file transmitting request comprises information on the file sending party, the file destination party and the file to be transmitted.

at step 302, the file receiving and forwarding server verifies the legitimacy of the file transmitting request; if legitimate, a subsequent step is performed; otherwise, a response that prohibits the transmitting is generated and returned to the backstage server that initiated the request;

at step 303, if it is determined that the file sending party is the backstage server that initiated the request, the file receiving and forwarding server determines whether the file destination party is another backstage server or the client server;

at step 304, if the file destination party is another backstage server, the file receiving and forwarding server reads a file from a network file system that corresponds to the file sending party according to the information on the file to be transmitted, and stores the file in a network file system that corresponds to the file destination party;

at step 305, if the file destination party is the client server, the network access server is informed to establish a connection between the file receiving and forwarding server and the client server, and a file is read from a network file system that corresponds to the file sending party according to the information on the file to be transmitted, and is forwarded to the client server;

at step 306, if it is determined that the file destination party is the backstage server that initiated the request, the file receiving and forwarding server determines whether the file sending party is another backstage server or the client server;

at step 307, if the file sending party is another backstage server, the file receiving and forwarding server reads a file from a network file system that corresponds to the file sending party according to the information on the file to be transmitted, and stores the file in a network file system that corresponds to the file destination party;

at step 308, if the file destination party is the client server, the network access server is informed to establish a connection between the file receiving and forwarding server and the client server, and the client server is informed to send file according to the information on the file to be transmitted and the received file is stored in a network file system that corresponds to the backstage server that initiated the request.

Preferably, at step 305, before the file receiving and forwarding module forwards the file to the client server, the file is pre-processed in order to generate a file that meets the requirements on the file format of the client server, and the pre-processed file is sent to the client server.

Preferably, the file transmitting request further comprises timing information. At step 302, in case that the file receiving and forwarding module determines that the file transmitting request is legitimate, the file receiving and forwarding server determines whether the timing information is satisfied; if satisfied, a subsequent step is perfoiined; otherwise, the file receiving and forwarding server records the file transmitting request as a file transmitting request that is to be processed, and a subsequent step is performed after the timing information is satisfied.

Preferably, further at step 309, the file receiving and forwarding server generates a file transmitting result message and sends it to the backstage server that initiated the request.

Figure 4:
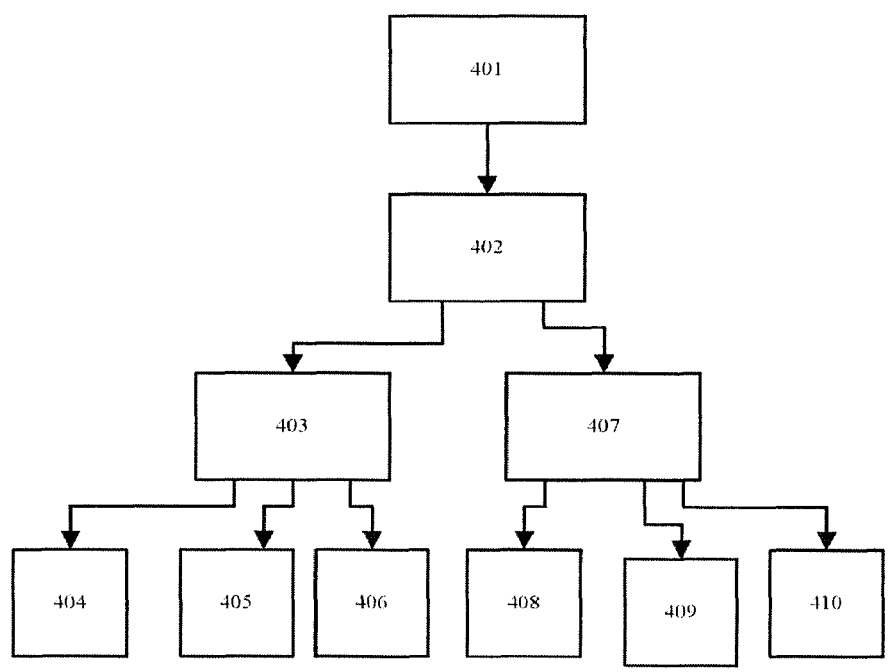
FIG. 4 schematically shows a flowchart of the file transmitting method of another embodiment of the invention.

FIG. 4 schematically shows a flowchart of the file transmitting method of another embodiment of the invention. The file transmitting method is used for a system comprising N network file systems, N file receiving and forwarding servers, N network access servers, N client servers and N backstage servers that are in a one-to-one correspondence with the network file systems.

As shown in FIG. 4, at step 401, the client server sends a file transmitting request to the verification module of the file receiving and forwarding server through the network access server, which file transmitting request comprises information on the file sending party, the file receiving party and the file to be transmitted;

at step 402, the verification module of the file receiving and forwarding server verifies the legitimacy of the file transmitting request; if legitimate, a subsequent step is performed; otherwise, a response that prohibits the transmitting is generated and returned to the client server that initiated the request;

at step 403, if it is determined that the file sending party is the client server that initiated the request, the file receiving and forwarding module determines whether the file destination party is the backstage server, another client server or the file receiving and forwarding server;

at step 404, if the file destination party is the backstage server, the client server is informed to send file according to the information on the file to be transmitted, and the received file is stored in a network file system that corresponds to the file destination party;

at step 405, if the file destination party is another client server, the network access server is informed to establish a connection between the file receiving and forwarding server and said another client server, and the client server is informed to send file according to the information on the file to be transmitted and the received file is forwarded to said another client server;

at step 406, if the file destination party is the file receiving and forwarding server, a network file system is designated according to a load balancing principle, and the client server is informed to send file according to the information on the file to be transmitted and the received file is stored in the designated network file system;

at step 407, if it is determined that the file destination party is the client server that initiated the request, the file receiving and forwarding module determines whether the file sending party is the backstage server, another client server or the file receiving and forwarding server;

at step 408, if the file sending party is the backstage server, a file is read from a network file system that corresponds to the backstage server according to the information on the file to be transmitted, and the received file is forwarded to the client server that initiated the request;

at step 409, if the file sending party is another client server, the network access server is informed to establish a connection between the file receiving and forwarding server and said another client server, and said another client server is informed to send file according to the information on the file to be transmitted and the received file is forwarded to the client server that initiated the request;

at step 410, if the file sending party is the file receiving and forwarding server, a network file system is determined according to the information on the file to be transmitted, a file is read from the determined network file system and the read file is forwarded to the client server that initiated the request.

Preferably, at step 405, when the file receiving and forwarding module determines that the file sending party is the client server that initiated the request and the file destination party is another client server, the network access server is informed to establish a connection between the file receiving and forwarding server and said another client server;

said another client server is informed by the network access server to receive file;

when the file receiving and forwarding server receives a response that permits the transmitting, the received file is forwarded to said another client server;

when a response that prohibits the transmitting is received, a network file system is designated according to a load balancing principle, and the received file is stored in the designated network file system; a file transmitting request that is to be processed is generated in which the file sending party is the file receiving and forwarding server and the file destination party is said another client server, and after a predetermined time period, the file transmitting request is performed until said another client server receives the file.

Preferably, at step 409, when the file receiving and forwarding module determines that the file sending party is another client server and the file destination party is the client server that initiated the request, the network access server is informed to establish a connection between the file receiving and forwarding server and said another client server;

said another client server is informed by the network access server to send file;

when the file receiving and forwarding server receives a response that permits the transmitting, the file received from said another client server and the received file is forwarded to the client server that initiated the request;

when a response that prohibits the transmitting is received, a first file transmitting request that is to be processed and a second file transmitting request that is to be processed are generated; in the first file transmitting request that is to be processed, the file sending party is said another client server, and the file destination party is the file receiving and forwarding server; and in the second file transmitting request that is to be processed, the file sending party is the file receiving and forwarding server, and the file destination party is the client server that initiated the request;

after a predetermined time, the first file transmitting request that is to be processed is performed;

after successfully performing the first file transmitting request that is to be processed, the second file transmitting request that is to be processed is performed.

Before the file receiving and forwarding module forwards the file to the client server, the file is pre-processed in order to generate a file that meets the requirements on the file format of the client server, and the pre-processed file is sent to the client server.

Preferably, the file transmitting request further comprises timing information. Further, at step 402, in case that the file receiving and forwarding module determines that the file transmitting request is legitimate, the file receiving and forwarding server determines whether the timing information is satisfied; if satisfied, a subsequent step is performed; otherwise, the file receiving and forwarding server records the file transmitting request as a file transmitting request that is to be processed, and a subsequent step is performed after the timing information is satisfied.

With the invention, a file transmitting can be realized between a backstage server and a client server, between backstage servers and between client servers, whereas there is no real network connection between the backstage server and the client server as well as between client servers, thus unitizing specifications and reducing investments on software and hardwares.

Further, since timing information can be provided in the file transmitting request, a file transmitting at a given time can be realized. Further, in case of failure of client server, a task polling service of the file receiving and forwarding server can be used to redo automatically, thereby further ensuring the reliability of file transmission.

Preferably, encryption and MAC verification can be performed during file transmission so as to further improve the safety in file transmission.

Further, each application server can be provided with different versions of application programs. For different packages, the N servers do not interfere with each other. When the system is being updated, the N servers can be updated in sequence, thus enabling an update without shutting down the system.

In view of the above teaching, those skilled in the art can easily envisage other embodiments, combinations and modifications of the invention. Therefore, the invention is merely defined by the claims when taken in combination with the above description and the accompanying drawings.

The invention claimed is:

1. An end-to-end file transmitting method for a file receiving and forwarding server, wherein the file receiving and forwarding server is provided in a file transmitting system coupling a plurality of network file systems including a first network file system and a second network file system, a plurality of network access servers including a first network access server and a second network access server, a plurality of client servers including a first client server and a second client server, and a plurality of backstage servers including a first backstage server and a second backstage server; and wherein the plurality of network file systems one-to-one correspond to the plurality of backstage servers, and the plurality of network access servers one-to-one correspond to the plurality client servers, each network access server being configured to establish a connection between the file receiving and forwarding server and the corresponding client server, the file transmitting method comprising:
  receiving, by the file receiving and forwarding server, multiple file transmitting requests from the first backstage server, wherein each of the multiple file transmitting requests indicates a file sending party, a file destination party and a file-to-be-transmitted, the first backstage server corresponds to the first network file system, the second network file system corresponds to the second backstage server, and the multiple file transmitting requests including a first file transmitting request indicating that the file sending party is the first backstage server and the file destination party is the second backstage server, and a second file transmitting request indicating that the file sending party is the first backstage server and the file destination party is the first client server;
  verifying, by the file receiving and forwarding server, legitimacy of each of the multiple file transmitting requests from the first backstage server and, after verifying that one of the multiple file transmitting requests is not legitimate, generating and returning a response prohibiting file transmitting to the first backstage server;
  after verifying that the first file transmitting request is legitimate, determining, by the file receiving and forwarding server, that the file sending party is the first backstage server, and the file destination party is the second backstage server, and completing, by the file receiving and forwarding server, end-to-end file transmitting between the first backstage server and the second backstage server by:
    reading the file-to-be-transmitted from the first network file system, and
    storing the file-to-be-transmitted in the second network file system for the second backstage server.

2. The end-to-end file transmitting method according to claim 1, further comprising:
  after verifying that the second file transmitting request is legitimate, determining that the file sending party is the first backstage server, and the file destination party is the first client server, wherein the first client server corresponds to the first network access server; and
  completing, by the file receiving and forwarding server, the end-to-end file transmitting between the first backstage server and the first client server by:
    causing the first network access server to establish the connection between the file receiving and forwarding server and the first client server;
    reading the file-to-be-transmitted from the first network file system; and
    forwarding the file-to-be-transmitted to the first client server.

3. The end-to-end file transmitting method according to claim 2, wherein, before forwarding the file-to-be-transmitted to the first client server, the method further comprises:
  pre-processing the file-to-be-transmitted to generate a pre-processed file that meets requirements of a file format of the first client server; and
  forwarding the pre-processed file to the first client server.

4. The end-to-end file transmitting method according to claim 1, wherein the multiple file transmitting requests include a third file transmitting request indicating that the file sending party is the second backstage server and the file destination party is the first backstage server, and the method further comprises:
  after verifying that the third file transmitting request is legitimate, determining that the file sending party is the second backstage server, and the file destination party is the first backstage server; and
  completing, by the file receiving and forwarding server, the end-to-end file transmitting between the second backstage server and the first backstage server by:
    reading the file-to-be-transmitted from the second network file system; and
    storing the file-to-be-transmitted in the first network file system for the first backstage server.

5. The end-to-end file transmitting method according to claim 1, wherein the multiple file transmitting requests include a fourth file transmitting request indicating that the file sending party is the first client server and the file destination party is the first backstage server, and the method further comprises:
  after verifying that the fourth file transmitting request is legitimate, determining that the file sending party is the first client server, and the file destination party is the first backstage server; and
  completing, by the file receiving and forwarding server, the end-to-end file transmitting between the first client server and the first backstage server by:
    causing the first network access server to establish a connection between the file receiving and forwarding server and the first client server; and
    receiving the file-to-be-transmitted from the first client server; and storing the file-to-be-transmitted on the first network file system for the first backstage server.

6. The end-to-end file transmitting method according to claim 5, further comprising:
  generating a file transmitting result message; and
  sending the file transmitting result message to the first backstage server.

7. The end-to-end file transmitting method according to claim 1, further comprising:
  receiving a client file transmitting request from the first client server, wherein the client file transmitting request includes a file sending party, a file destination party and a file-to-be-transmitted, wherein the file sending party indicating one of the first client server, the second client server, and the first backstage server, the file destination party indicating one of the second client server, the first backstage server, and the file receiving and forwarding server when the file sending party is the first client server, and the file destination party indicating the first client server when the file sending party is the second client server or the first backstage server;
  after determining that the file sending party is the first client server, and the file destination party is the file receiving and forwarding server, designating a network file system according to a load balancing principle, informing the first client server to send file according to the client file transmitting request, and storing a received file in the designated network file system.

* * * * *